United States Patent
Gray et al.

(10) Patent No.: US 7,366,703 B2
(45) Date of Patent: Apr. 29, 2008

(54) SMARTCARD INTERNET AUTHORIZATION SYSTEM

(75) Inventors: William J. Gray, Salt Lake City, UT (US); William G. Hohle, North Lehi, UT (US); Carl Larkin, Barnham Bognore Regis (GB); Lee J. Peart, Shioiju (GB)

(73) Assignee: American Express Travel Related Services Company, Inc., New York, NY (US)

( * ) Notice: Subject to any disclaimer, the term of this patent is extended or adjusted under 35 U.S.C. 154(b) by 637 days.

(21) Appl. No.: 09/754,465

(22) Filed: Jan. 4, 2001

(65) Prior Publication Data

US 2001/0037312 A1 Nov. 1, 2001

Related U.S. Application Data

(60) Provisional application No. 60/174,564, filed on Jan. 5, 2000.

(51) Int. Cl.
*H04K 1/00* (2006.01)
*H04L 9/00* (2006.01)

(52) U.S. Cl. .......................... 705/78; 705/64; 705/65; 705/67

(58) Field of Classification Search ................ 705/1, 705/26, 64, 50, 51, 75, 76, 78, 65, 27
See application file for complete search history.

(56) References Cited

U.S. PATENT DOCUMENTS

| | | | |
|---|---|---|---|
| 5,221,838 A | | 6/1993 | Gutman et al. |
| 5,500,890 A | | 3/1996 | Rogge et al. |
| 5,517,569 A | * | 5/1996 | Clark .......................... 380/52 |
| 5,590,038 A | | 12/1996 | Pitroda |
| 5,590,197 A | * | 12/1996 | Chen et al. ................... 705/65 |
| 5,613,001 A | | 3/1997 | Bakhoum |
| 5,721,781 A | * | 2/1998 | Deo et al. ...................... 705/67 |
| 5,739,512 A | * | 4/1998 | Tognazzini ................. 235/380 |
| 5,748,737 A | | 5/1998 | Daggar |
| 5,815,657 A | * | 9/1998 | Williams et al. ............... 705/1 |

(Continued)

FOREIGN PATENT DOCUMENTS

EP     0 813 325 A2     12/1997

(Continued)

OTHER PUBLICATIONS

"Secure transactions over the internet", Jim Montgomery, Communications News, Mar 1997.*

*Primary Examiner*—Calvin Loyd Hewitt, II
(74) *Attorney, Agent, or Firm*—Snell & Wilmer L.L.P.

(57) ABSTRACT

A system and method are disclosed for conducting electronic commerce such as a virtual purchase transaction with an on-line merchant. A user is provided with an intelligent token, such as a smart card containing a digital certificate. The intelligent token suitably authenticates with a wallet server on a network that conducts all or portions of the transaction on behalf of the user with out requiring changes to the merchant's server. The wallet server interacts with a security server of a selected financial service to provide authentication of the transaction. Upon authentication, the digital wallet pre-fills forms which are transmitted to the merchant who contacts the security server for validation of the forms and upon validation, completes the transaction with the user.

6 Claims, 2 Drawing Sheets

U.S. PATENT DOCUMENTS

| | | |
|---|---|---|
| 5,850,442 A | 12/1998 | Muftic |
| 5,878,141 A * | 3/1999 | Daly et al. .................... 705/78 |
| 5,883,810 A | 3/1999 | Franklin et al. |
| 5,903,721 A | 5/1999 | Sixtus |
| 5,917,912 A | 6/1999 | Ginter et al. |
| 5,943,423 A | 8/1999 | Muftic |
| 5,956,483 A | 9/1999 | Grate et al. |
| 5,978,840 A | 11/1999 | Nguyen et al. |
| 5,987,132 A | 11/1999 | Rowney |
| 5,996,076 A | 11/1999 | Rowney et al. |
| 6,003,014 A | 12/1999 | Lee et al. |
| 6,012,049 A | 1/2000 | Kawan |
| 6,049,785 A * | 4/2000 | Gifford ........................ 705/39 |
| 6,076,075 A * | 6/2000 | Teicher ........................ 705/41 |
| 6,327,578 B1 * | 12/2001 | Linehan ....................... 705/65 |

FOREIGN PATENT DOCUMENTS

| | | |
|---|---|---|
| EP | 0 926 637 A2 | 6/1999 |
| EP | 0 927 945 A2 | 7/1999 |
| WO | WO 01/15034 A1 | 3/2001 |

* cited by examiner

SMARTCARD INTERNET AUTHORIZATION SYSTEM

CROSS REFERENCE TO RELATED APPLICATIONS

This application claims the benefit of U.S. Provisional Application No. 60/174,564, filed Jan. 5, 2000, the entire contents of which are incorporated by reference.

FIELD OF THE INVENTION

The invention relates generally to methods and apparatus for conducting network transactions, and more particularly, to systems for authenticating and conducting business over data networks such as the Internet.

BACKGROUND OF THE INVENTION

In recent years, many consumers have discovered the convenience and economy of purchasing goods and services electronically. A number of channels for electronic purchases (commonly called "e-purchases") are available, including shop-at-home television networks, call-in responses to television advertisements, and the like. Most recently, direct purchasing via the Internet has become extremely popular.

In a typical Internet transaction, a consumer generally identifies goods and/or services for purchase by viewing an online advertisement such as a hypertext markup language (HTML) document provided via a World Wide Web (WWW) browser. Payment typically occurs in various ways. One such way is via a charge card number that is provided via a secure channel such as a secure sockets layer (SSL) connection that is established between the consumer and the merchant.

While millions of such transactions take place every day via the Internet, these conventional SSL transactions often exhibit a number of marked disadvantages. Although SSL typically provides a secure end-to-end connection that prevents unscrupulous third parties from eavesdropping (e.g., "sniffing") or otherwise obtaining a purchaser's charge card number, the protocol does not provide any means for ensuring that the charge card number itself is valid, or that the person providing the card number is legally authorized to do so. Because of the high incidence of fraud in Internet transactions, most charge card issuers consider network transactions to be "Card Not Present" transactions subject to a higher discount rate. Stated another way, because of the increased risk from "Card Not Present" transactions, most charge card issuers charge the merchant a higher rate for accepting card numbers via electronic means than would be charged if the card were physically presented to the merchant.

To improve the security deficiencies inherent in transporting charge card numbers over unsecure networks, many have suggested the use of "smart cards". Smartcards typically include an integrated circuit chip having a microprocessor and memory for storing data directly on the card. The data can correspond to a cryptographic key, for example, or to an electronic purse that maintains an electronic value of currency. Many smart card schemes have been suggested in the prior art, but these typically exhibit a marked disadvantage in that they are non-standard and typically require the merchants to obtain new, proprietary software for their Web storefronts to accept the smart card transactions. Moreover, the administration costs involved with assigning and maintaining the cryptographic information associated with smart cards have been excessive to date.

Another standard, the Secure Electronic Transaction (SET) standard has been suggested to improve the security of Internet transactions through the use of various cryptographic techniques. Although SET does provide improved security over standard SSL transactions, the administration involved with the various public and private keys required to conduct transactions has limited SET's widespread acceptance. SET also requires special software for those merchants wishing to support SET transactions.

Additionally, existing digital wallet technology, such as the digital wallet technology provided by, for example, GlobeSet, Inc., 1250 Capital of Texas Highway South, Building One, Suite 300, Austin, Tex., 78746, is being more frequently used to provide a means for users to utilize transaction card products (e.g., credit, charge, debit, smart cards, account numbers and the like) to pay for products and services on-line. In general, digital wallets are tools which store personal information (name, address, chargecard number, credit card number, etc.) in order to facilitate electronic commerce or other network interactions. The personal information can be stored on a general server or at a client location (PC or Smartcard) or on a hybrid of both a general server and a client server. Presently, the digital wallet general server is comprised of a Web server and a database server which centrally houses the user's personal and credit card information, shopping preferences and profiles of on-line merchants.

A digital wallet preferably performs functions such as single sign on/one password, automatic form filling of check out pages, one or two click purchasing, personalization of Websites, on-line order and delivery tracking, itemized electronic receipts, and customized offers and promotions based upon spending patterns and opt-ins. More particularly, a one-click purchase activates the wallet and confirms the purchase at the same time. A two-click check out first activates the wallet, then the second click confirms the purchase. In use, the wallet bookmark is typically clicked by the user and an SSL session is established with the Wallet server. A browser plug-in is executed and the user supplies an ID/password or smart card for authentication in order to gain access to the wallet data. When shopping at an on-line merchant, the appropriate wallet data is transferred from the wallet server to the merchant's Web server.

Existing systems, however, generally require that a merchant initiate changes to accommodate each different smart card or wallet. Accordingly, a new system of conducting electronic transactions is desired which would provide improved security with minimal overhead for users and merchants. Moreover, such a new system should integrate well with various smart cards and Internet wallets and other services provided by various merchants without requiring the merchant to make substantial changes to permit use of different systems.

SUMMARY OF THE INVENTION

In an exemplary embodiment of the invention, a user is provided with a smart card having a standardized protocol to make credit and debit transactions, such as, for example, the Blue™ from American Express™ smart card or the Europay MasterCard™ Visa™ (EMV) smart card. The user, also known as the cardmember (CM), utilizes the EMV Smartcard to interface with a wallet server to authenticate the user with a merchant server on a network through communications with a security server provided by a financial institution or credit provider such as, for example, American Express (AMEX). The CM purchaser conducts a virtual purchase transaction via the internet through a wallet server interacting with the security server to provide enhanced reliability and confidence in the transaction.

The user logs onto the internet via a browser and selects a wallet, causing the establishment of a secure sockets layer link to the wallet server and, at about the same time, activates the client window. The wallet server requests the user to insert the smartcard for authentication to the server wallet account. With an encrypted identity certificate being set, the user then selects the credit provider/financial institution, such as AMEX, who will be providing guarantee of the payment, from the provider available in the wallet. The user then logs onto the merchant server, completes shopping, goes to the checkout screen and clicks secure checkout. Again, the interfaces are over a secure sockets layer.

Next, the wallet server completes the form and transmits it to the merchant server, which uses telephone connections via a modem, direct link to a third party processor or directly to the security processor of the credit provider. The credit provider security processor uses the wallet interface to the user card to access smartcard functionality and generates a signed transaction. Alternatively, the connection can also be used to securely update functionality as required. The AMEX security processor authorizes the transaction on a "card press" basis. The merchant server then integrates the authorization with the wallet server completed form received from the wallet server and successfully completes the transaction, informing the user that the transaction has been successfully completed.

Thus, electronic transactions, such as purchase transactions, are conducted by receiving a transaction request from a user at a wallet server, issuing a challenge to the user from the wallet server, receiving a response from the user based upon the challenge, processing the response to verify the transaction instrument, assembling credentials (including authorization for the electronic transaction), and interfacing with a security server to authenticate the transaction. The system provides the benefits of protecting the market and the credit provider from fraud, transaction non-imputation, an ability to modify parameters on-line, and providing the user with better service at a lower cost by reducing the costs to the merchant because the entire process is transparent to the merchant.

BRIEF DESCRIPTION OF THE DRAWINGS

The above and other features and advantages of the present invention are hereinafter described in the following detailed description of exemplary embodiments to be read in conjunction with the accompanying drawing figures, wherein like reference numerals are used to identify the same or similar parts or steps in the similar views, and.

DETAILED DESCRIPTION OF EXEMPLARY EMBODIMENTS

Figure 1:
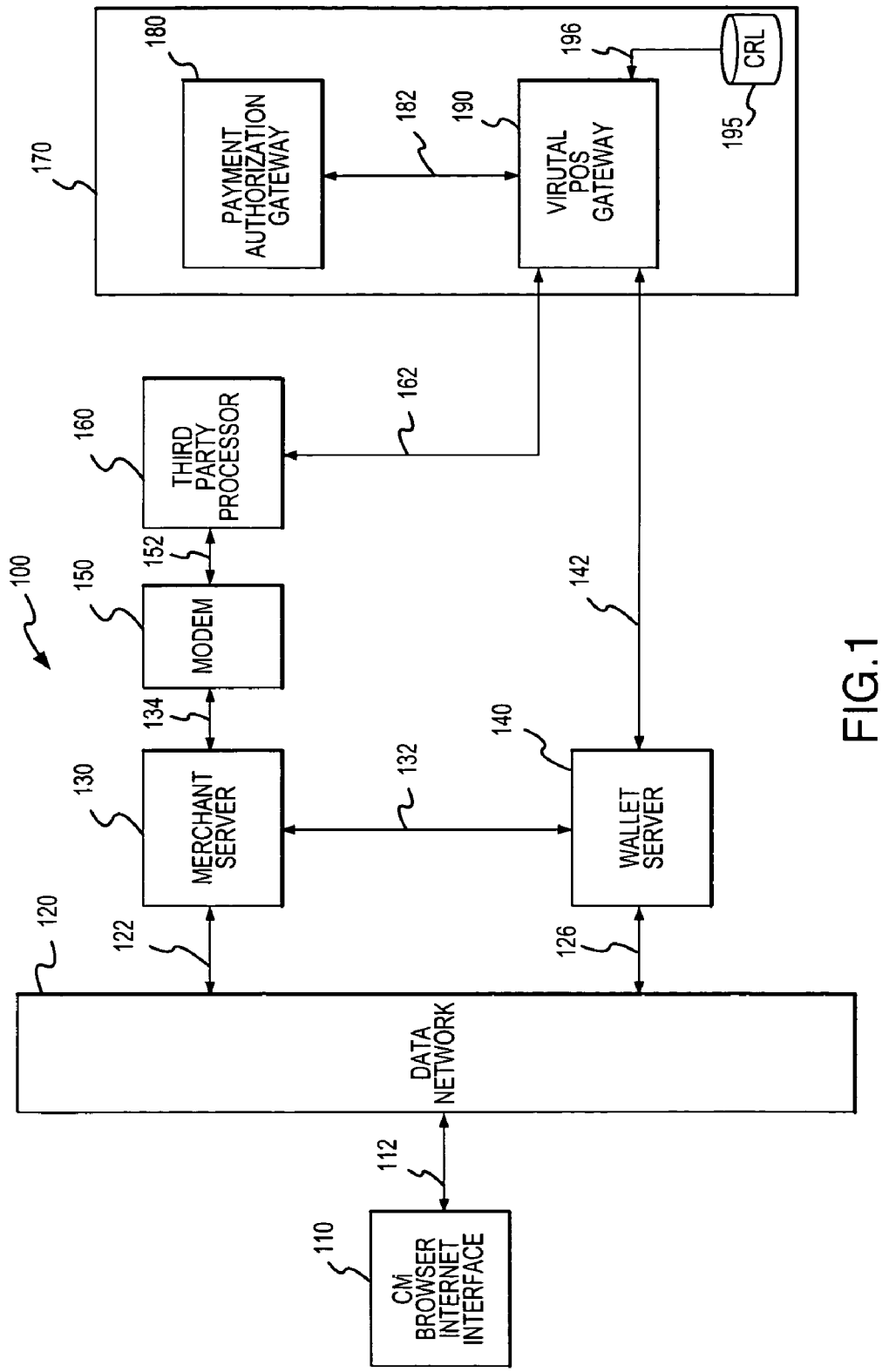
FIG. 1 is a block diagram of an exemplary embodiment of the transaction system of the present invention.

The present invention may be described herein in terms of functional block components and various processing steps. It should be appreciated that such functional blocks may be realized by any number of hardware and/or software components configured to perform the specified functions. For example, the present invention may employ various integrated circuit (I.C.) components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a scripting language, such as JavaScript, VBScript or the like. For a basic introduction of cryptography, please review a text written by Bruce Schneider which is entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

To simplify the description of the exemplary embodiment, the invention is described as pertaining to a system of electronic commerce, i.e., transactions, running over the Internet. It will be appreciated, however, that many applications of the present invention could be formulated. For example, the system could be used to authenticate users of a computer system, or to activate a passcode system, or any other purpose. One skilled in the art will appreciate that the network may include any system for exchanging data or transacting business, such as the Internet, an intranet, an extranet, WAN, LAN, satellite communications, and/or the like. Communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows 2000, Windows 98, Windows 95, MacOS, OS/2, BeOS, Linux, UNIX, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols.

Furthermore, the user and merchant may represent individual people, entities, or business and while reference is made to AMEX, this is by way of example and the financial authorization entity may represent various types of card issuing institutions, such as banks, credit card companies, card sponsoring companies, or third party issuers under contract with financial institutions. The payment network includes existing proprietary networks that presently accommodate transactions for credit cards, debit cards, and other types of financial/banking cards.

Additionally, other participants may be involved in some phases of the transaction, such as an intermediary settlement institution, but these participants are not shown. Each participant is equipped with a computing system to facilitate transactions. The user has a personal computer, the merchant has a computer/server, and the financial authorization entity has a main frame computer; however, any of the computers may be a mini-computer, a PC server, a network set of computers, laptops, notebooks, hand held computers, set-top boxes, and the like.

The customer and merchant may represent individual people, entities, or business. Although labeled as a "bank," the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing system to facilitate online commerce transactions. The customer has a computing unit in the form of a personal computer, although other types of computing units may be used including laptops, notebooks, hand held computers, set-top boxes, and the like. The merchant has a computing unit implemented in the form of a computer-server, although other implementations are possible. The bank has a computing center shown as a main frame computer. However, the bank computing center may be implemented in other forms, such as a mini-computer, a PC server, a network set of computers, and the like.

The computing units are connected with each other via a data communication network. The network is a public network and assumed to be insecure and open to eavesdroppers. In the illustrated implementation, the network is embodied as the internet. In this context, the computers may or may not be connected to the internet at all times. For instance, the customer computer may employ a modem to occasionally connect to the internet, whereas the bank computing center might maintain a permanent connection to the internet. It is noted that the network may be implemented as other types of networks, such as an interactive television (ITV) network.

The merchant computer and the bank computer are interconnected via a second network, referred to as a payment network. The payment network represents existing proprietary networks that presently accommodate transactions for credit cards, debit cards, and other types of financial/banking cards. The payment network is a closed network that is assumed to be secure from eavesdroppers. Examples of the payment network include the American Express®, Visa-Net® and the Veriphone® network.

The electronic commerce system is implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

Referring now to FIG. 1, a transaction system 100 typically includes at least one user or cardmember (CM) having a computer incorporating an internet browser 110 adapted to interface with a data network. In an exemplary embodiment, transaction system 100 is used in electronic commerce to conduct purchase transactions. It will be appreciated that although the transaction system described herein is an electronic commerce system, the present invention is equally applicable to various other electronic transaction systems. Specifically, the user system 110 is a purchaser or user which interfaces with a computer having an interface through data network 120 to a merchant server 130 and also to a digital wallet server 140.

The various computer systems and servers are interconnected as appropriate by data network 120, which is any data network, such as the internet or other public or private data network. Other suitable networks 120 include the public switch telephone network (PSTN), wireless networks, corporate or university intranets, and the like. Additionally, merchant server 130 is coupled to a modem 150 which is in communication with a third party processor (TPP) 160 which may be, but is not necessarily included, in the financial authorization entity secure processor 170. TPP 160 is further coupled to a virtual point of sale (POS) gateway processor 190 which is in the financial authorization entity secure processor 170. Also in the secure processor 170, and coupled to POS gateway processor 190, is payment authorization gateway 180. Further, wallet server 140 is coupled to merchant server 130 and to virtual point of sale (VPOS) gateway processor 190.

While an exemplary embodiment has been illustrated in FIG. 1, it will be appreciated that other embodiments are possible. Thus, as also described above, components (e.g., user 110, merchant 130, and wallet server 140) may be individual computers or network groups of computers acting with similar purpose to fulfill the functions described herein. Functionality attributed to a single component may be distributed among one or more individual computers in order to fulfill the described functionality. For example, the wallet server 140 may in fact be a collection of web servers, application servers, data base servers, and other types of servers. Also, in various embodiments, data bases (not shown) and/or profile servers (not shown) may be connected to wallet server 140. For further information related to smart cards, browser functions, digital wallets and e-commerce transactions, see U.S. patent applications "Transaction Card", U.S. Ser. No. 9/653,837, filed on Sep. 1, 2000; "Method and Apparatus for Conducting Electronic Transactions", U.S. Ser. No.: 09/652,899, filed on Aug. 31, 2000; "System and Method For Authenticating A Web Page", U.S. Ser. No. 09/656,074, filed on Sep. 6, 2000; and, "System and Method For Profiling A Web Site", U.S. Ser. No. 09/656, 061, filed on Sep. 6, 2000, all of which are herein incorporated by reference.

To conduct a transaction, user 110 suitably establishes a connection through network 120 with a merchant 130. When a purchase is to be consummated, user 110 accesses wallet server 140. User 110 is then directed by wallet server 140 to insert a Smart Card into, for example, a card reader system to verify that a Smart Card is in the user's 110 possession. At the same time, a graphical representation of wallet 140 appears to the user 110 and user 110 is directed to select a transaction authorization entity, such as American Express (AMEX). The Smart Card preferably includes a digital certificate that uniquely identifies the card such that digital credentials relating to the transaction may be created as described hereinafter. Upon receipt of the Smart Card information, wallet server 140 communicates with virtual POS gateway 190. Virtual gateway 190 queries payment authorization gateway 180 to obtain authorization for the payment. Upon obtaining such authorization, virtual POS gateway transmits the information to wallet server 140. Wallet server 140 then completes an authorization form and transmits the form to merchant server 130.

Upon receipt of the authorization form, merchant server via modem 150 communicates with third party processor 160, which in turn communicates with virtual POS gateway 190, again querying payment authorization gateway 180. Again, virtual POS gateway 190 communicates through third party processor 160 via modem 150 to merchant server 130, authenticating the completed form. Once completed, merchant server 130 authorizes the transaction and the transaction is completed, and the user 110 is notified.

Figure 2:
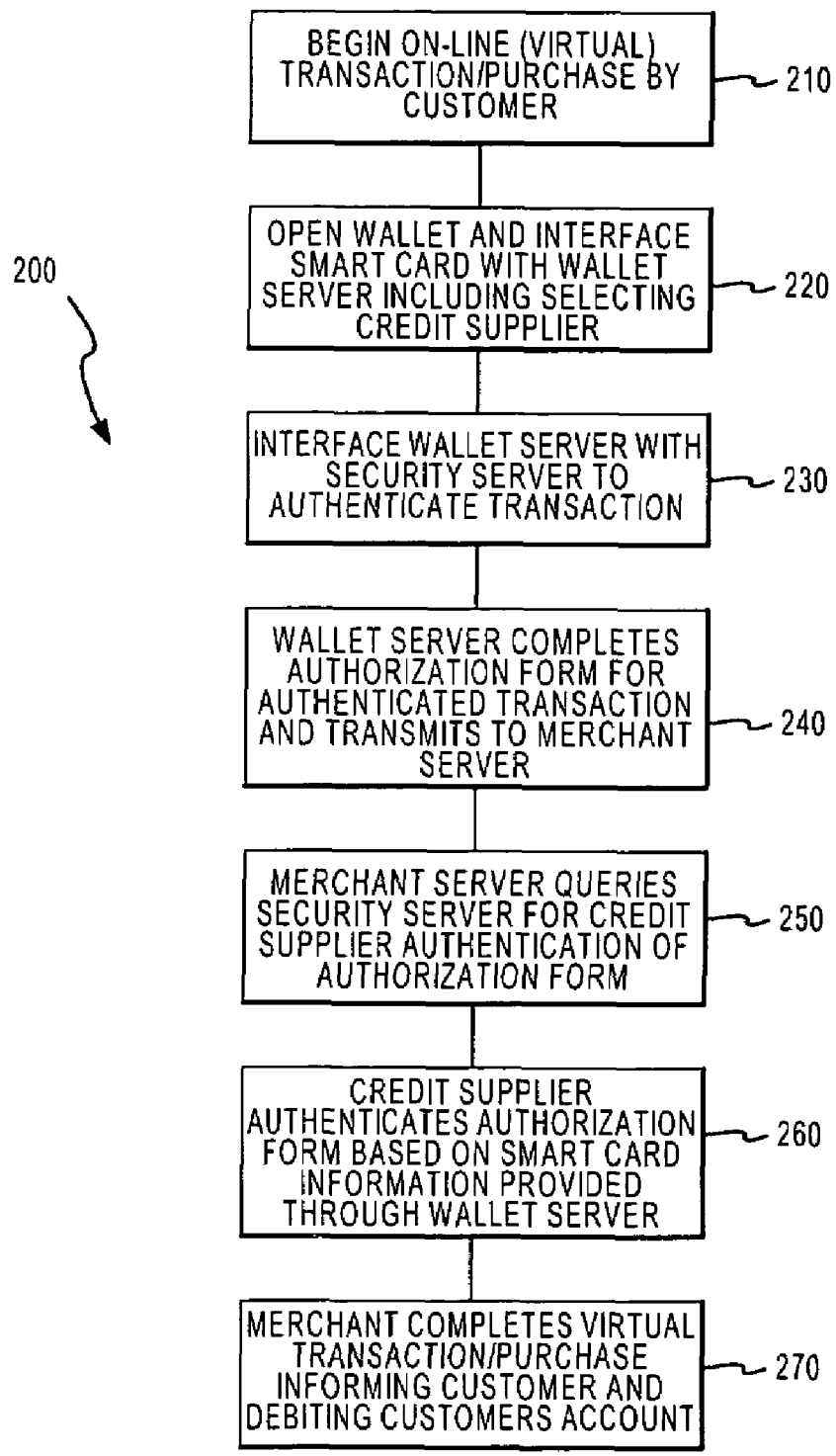
FIG. 2 is a diagram of an exemplary process executed by the exemplary transaction system of FIG. 1.

Referring also to FIG. 2, the flowchart shows an exemplary sequence of events involved in the on-line virtual transaction. As shown at step (210), a virtual transaction purchase by a customer is begun on-line, with a customer communicating with a vendor. At the completion of shopping, the customer or user 110 initiates a secure checkout procedure as shown in step (220), opening the wallet and interfacing a Smart Card with the wallet server 140, including selecting the credit supplier. The wallet server 140 interfaces at step (220) with a security server to authenticate the transaction. In step (240), the wallet server 140 receives transactional authentication, completes an authorization form for the transaction and transmits the form to the merchant server 130. In step (250), the merchant server queries the security server for credit supplier authentication of the authorization form. Based on the information supplied by the credit supplier, and in conjunction with the authentication above discussed in the previous steps, the credit supplier authenticates the authorization form based on the information from the Smart Card provided through the wallet server and transmits an authentication to the merchant server 130. Upon receipt of the authorization form, the merchant completes the virtual transaction/purchase, informing the customer and debiting the customer's account.

Because the Smart Card as above-described contains identifying information that is unique to a particular card, the purchase transaction conducted with the Smart Card is more secure than a transaction conducted with an ordinary charge or credit card. Accordingly, a discount rate may be justified for the secure transaction, which may be processed by the card issuer as a "card present" transaction. Additionally, if the transaction is a "card present" transaction, risk of fraud may be transferred from the merchant to the card issuer.

Thus, the present invention is directed to a system and method for permitting the authentication of a virtual on-line transaction where a user, by the use of a Smart Card and a wallet server, may have on-line virtual transactions authenticated to a merchant using various Smart Cards and credit providers while minimizing changes to the merchant's server to accommodate a number of different types of systems.

Accordingly, corresponding structures, acts, and equivalents of all elements in the claims below are intended to include any structural material or acts for performing the functions in combination with other elements as specifically claimed. The scope of the invention should be determined by the allowed claims and their legal equivalents, rather than by the examples given above.

What is claimed is:

1. A method for authorizing a transaction, the method comprising:
   completing shopping by a user at a merchant server;
   initiating a transaction based on said shopping by receiving a request over a network at a wallet server, from said user, for payment authorization, wherein said request includes smartcard information and a selection of a financial institution;
   prompting said user to physically interface a smartcard with a card reader system, wherein said smartcard comprises smartcard information including a digital certificate uniquely identifying said smartcard;
   receiving said smartcard information from a computer coupled to said card reader system;
   sending an authentication request for said transaction to a security server of said selected financial institution and said smartcard information by said wallet server;
   receiving an authentication for said transaction from said security server;
   completing an authorization form for said transaction and transmitting said authorization form to said merchant server;
   authenticating said authorization form by said security server using said smartcard information; and,
   receiving authorization form authentication from said security server by said merchant server, and said merchant server completing said transaction and debiting an account of said user.

2. A method for authorizing a transaction, the method comprising:
   completing shopping by a user at a merchant server;
   initiating a transaction based on said shopping by receiving a request over a network at a wallet server, from said user, for payment authorization, wherein said request includes smartcard information and a selection of a financial institution;
   prompting said user to physically interface a smartcard with a card reader system, wherein said smartcard comprises smartcard information including a digital certificate uniquely identifying said smartcard;
   receiving said smartcard information from a computer coupled to said card reader system;
   sending an authentication request for said transaction and said smartcard information by said wallet server to a security server of said selected financial institution;
   receiving by the wallet server an authentication for said transaction from said security server;

completing an authorization form for said transaction by the wallet server and transmitting said authorization form to said merchant server;

requesting authorization of the authentication form from the security server by the merchant server;

authenticating said authorization form by said security server using said smartcard information; and, receiving authorization form authentication from said security server by said merchant server, and said merchant server completing said transaction and debiting an account of said user.

3. The method of claim 1, wherein said wallet server is a digital wallet server.

4. The method of claim 1, wherein said card reader system is a smart card reader system.

5. A system for authorizing a transaction, the system comprising:

a wallet server comprising:

a first hardware interface receiving an authorization request over a network from a user, for payment authorization, wherein said authorization request includes smartcard information from a smartcard and a selection of a financial institution;

a second hardware interface prompting said user to physically interface a smartcard with a card reader system, wherein said smartcard comprises smartcard information including a digital certificate uniquely identifying said smartcard;

memory receiving said smart card information from a computer coupled to said smart card system;

a processor sending an authentication request for said transaction and said smartcard information to a security server of said financial institution;

a first hardware module receiving an authentication for said transaction from said security server;

a second hardware module completing an authorization form for said transaction and transmitting said authorization form to said merchant server said security server comprising:

a hardware module authenticating said authorization form by using said smartcard information;

said merchant server comprising:

a first processor requesting authorization of the authentication form from the security server;

a second processor receiving authorization form authentication from said, security server, completing said transaction and debiting an account of said user.

6. A computer-readable storage medium containing a set of instructions for a general purpose computer, wherein said set of instruction when executed by the general purpose computer cause the computer to perform the steps of:

completing shopping by a user at a merchant server;

initiating a transaction based on said shopping by receiving a request over a network at a wallet server, from said user, for payment authorization, wherein said request includes smartcard information and a selection of a financial institution;

prompting said user to physically interface a smartcard with a card reader system, wherein said smartcard comprises smartcard information including a digital certificate uniquely identifying said smartcard;

receiving said smartcard information from a computer coupled to said card reader system;

sending an authentication request for said transaction and said smartcard information by said wallet server to a security server of said selected financial institution;

receiving by the wallet server an authentication for said transaction from said security server;

completing an authorization form for said transaction by the wallet server and transmitting said authorization form to said merchant server;

requesting authorization of the authentication form from the security server by the merchant server;

authenticating said authorization form by said security server using said smartcard information; and, receiving authorization form authentication from said security server by said merchant server, and said merchant server completing said transaction and debiting an account of said user.

* * * * *